March 26, 1929.  F. M. KELLIE  1,706,787
GRAIN SEPARATOR
Filed Jan. 29, 1925
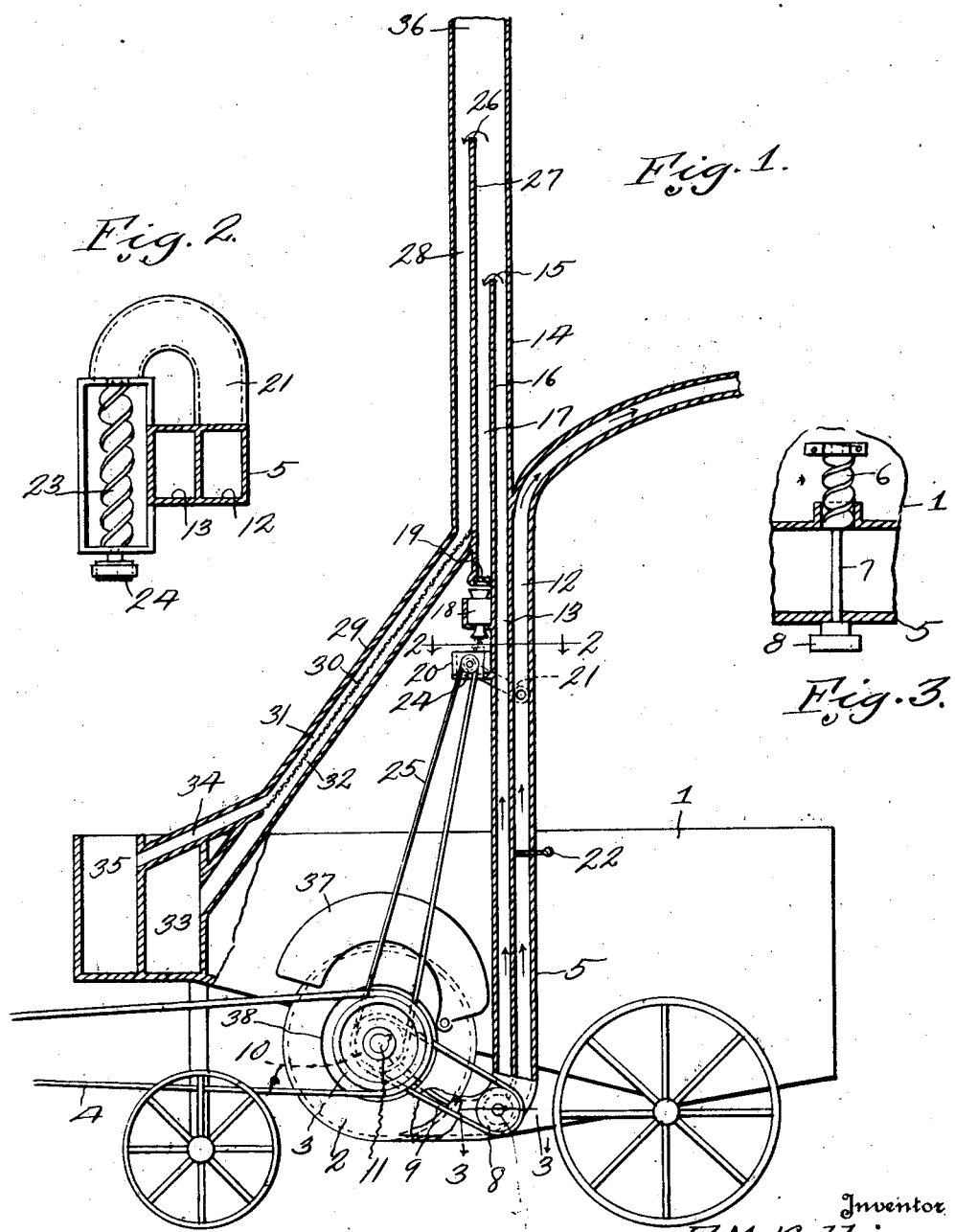
Inventor
F. M. Kellie
By Philip A. H. Sewell
Attorney Patented Mar. 26, 1929.

1,706,787

UNITED STATES PATENT OFFICE.

FRANCIS M. KELLIE, OF WAUNETA, NEBRASKA.

GRAIN SEPARATOR.

Application filed January 29, 1925. Serial No. 5,604.

The invention relates to grain separating devices, preferably of the portable type, and particularly adapted for separating grain into various sizes, however adapted for use in connection with various kinds of seed.

A further object is to provide a grain separating device comprising a bin, a blower fan adjacent one side thereof and provided with an upwardly extending discharge pipe, into which grain is discharged from a grain bin into the path of a blast of air from the blower, and which grain is forced upwardly through the discharge pipe over partitions forming discharge conduits at different elevations whereby grain of different sizes will be graded according to size.

A further object is to provide at the lower discharge end of one of the conduits a weighing device, which discharges into a bin having a rotatable feed worm, which forces the grain through a pipe which discharges into a conduit of the discharge pipe from the blower whereby the graded grain may be discharged wherever desired by the force of the blower.

A further object is to drive the blower and the feed worm from a single source of power.

A further object is to provide at the lower end of one of the conduits a downwardly extending trough having a screened partition therein, and into which conduit and trough unthreshed grain and trash is discharged and separated by the screen and conveyed to bins.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a machine, showing the discharge spout and a portion of the body of the device in vertical longitudinal section.

Figure 2 is a horizontal sectional view taken on line 2—2 of Figure 1.

Figure 3 is a horizontal sectional view taken on line 3—3 of Figure 1.

Referring to the drawing, the numeral 1 designates the body of the machine, in which grain to be separated is disposed. Disposed adjacent the side of the body 1 is a conventional form of centrifugal blower fan 2, which is driven by the pulley 3, over which the drive belt 4 extends. The drive belt 4 may lead to any suitable source of power. Extending rearwardly and upwardly from the fan 2 is a discharge pipe 5, into which grain from the body of bin 1 is fed by means of the feed screw 6, which feed screw is carried by the shaft 7 extending through the discharge pipe 5, and is driven by means of the pulley 8, over which the belt 9 extends. The belt 9 extends over a pulley 10 carried by the fan drive shaft 11, on which the pulley 3 is mounted, therefore it will be seen that as the fan is rotated, the feed screw 6 will also be rotated for feeding grain into the lower end of the discharge pipe 2.

The discharge pipe 5 is provided with a plurality of passages 12 and 13, and the grain is forced upwardly by the blast of air through the passage 13 into the enlarged portion 14 of the discharge pipe, and the blast of air is sufficiently strong, whereby the heavy grain will be elevated to the top 15 of the partition 16, and will drop downwardly into the passage 17, and into the weighing machine 18 after the slide 19 is removed. The heavier grain after passing through the weighing machine, which machine is of conventional structure, is discharged into the bin 20, and thence forced through the pipe 21, which discharges into the passage 12, and from which passage said grain may be conveyed to any suitable place of discharge by removing the slide door 22, and allowing the blast of air to pass upwardly through the passage 21. The bin 20 in which the feed screw 23, is disposed, may be of any suitable size, however the feed screw 23 is provided with a pulley 24, over which a belt 25 extends, and which belt extends over the pulley, consequently all of the working parts of the device are driven from a single source of power. Unseparated grain, that is light grain and chaff is forced upwardly until it is forced over the upper end 26 of the partition 27 and into the discharge passage 28, and through which passage it passes into the chute 29, which chute is divided by means of a screen 30 into chambers 31 and 32. The light grain will pass through the screen 30 into the passage 32 and will be discharged into the bin 33, while the chaff will be discharged through the chute 34 into the bin 35 or to any other suitable place. A portion of the chaff and other foreign matter will be blown upwardly into the upper end of the pipe 5 at 36. By providing the sliding door 22, loss of power from the blast of air may be obviated during a separating operation when the passage 12 is not in use. However the blower 2 is preferably provided with a damper 37 whereby the amount of air entering the fan through the intake opening 38 may be varied.

From the above it will be seen that a grain separating device is provided, which is simple in construction, positive in its operation and one wherein grain will be separated and graded according to the size thereof. It will also be seen that chaff and other foreign matter will be separated from the grain and light particles discharged with the chaff, for instance dirt and the like.

The invention having been set forth what is claimed as new and useful is:—

1. A grain separating device comprising a bin, a blower fan, a discharge pipe extending upwardly from said blower fan and provided with a plurality of air passages, a feed screw for feeding grain from the bin into the discharge pipe, said discharge pipe adjacent its upper end being provided with a downwardly extending passage into which heavy grain drops, a bin at the lower end of the downwardly extending passage, means for discharging grain from this bin into one of the passages of the pipe opposite the bin whereby said grain can be conveyed and discharged by the blower and means for operating said blower, feed screw and conveying means carried by the bin from a single source of power.

2. A grain separator comprising a bin, a blower fan, a discharge pipe carried by said blower fan and extending upwardly, said discharge pipe being provided with a plurality of partitions of different height thereby forming downwardly extending grain passages, a bin at the lower end of one of the downwardly extending passages, means for conveying grain from said bin into a discharge passage of the pipe, one of said discharge passages terminating in a downwardly inclined discharge trough, said discharge trough being divided into chambers and bins into which material from said last named chambers discharge.

In testimony whereof I hereunto affix my signature.

FRANCIS M. KELLIE.